(12) United States Patent
Maier (10) Patent No.: US 8,206,039 B2
(45) Date of Patent: Jun. 26, 2012

(54) SUPPORT DEVICE FOR BEARING ASSEMBLIES

(75) Inventor: Martin Donald Maier, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 555 days.

(21) Appl. No.: 12/083,845

(22) PCT Filed: Oct. 20, 2006

(86) PCT No.: PCT/US2006/041127
§ 371 (c)(1),
(2), (4) Date: Sep. 21, 2009

(87) PCT Pub. No.: WO2007/047976
PCT Pub. Date: Apr. 26, 2007

(65) Prior Publication Data
US 2010/0021095 A1 Jan. 28, 2010

Related U.S. Application Data

(60) Provisional application No. 60/728,711, filed on Oct. 20, 2005.

(51) Int. Cl.
*F16C 27/00* (2006.01)

(52) U.S. Cl. .............................. 384/99; 384/535; 384/581
(58) Field of Classification Search ................... 384/99, 384/215, 535, 581
See application file for complete search history.

(56) References Cited

U.S. PATENT DOCUMENTS

| 4,213,661 A | 7/1980 | Marmol |
| 4,872,767 A | 10/1989 | Knapp |
| 5,425,584 A | 6/1995 | Ide |
| 5,803,612 A | 9/1998 | Battig |
| 6,155,720 A | 12/2000 | Battig |
| 2006/0204153 A1 | 9/2006 | Alam et al. |

*Primary Examiner* — Thomas R Hannon
(74) *Attorney, Agent, or Firm* — Edmonds & Nolte, PC (57) ABSTRACT

A support device for a bearing assembly includes a housing with a bore and a centerline and a bearing having a bore for receiving a rotatable shaft. The support device has an annular body disposable within the housing bore and having a central axis and inner and outer surfaces extending circumferentially about the axis, the inner surface defining a central bore for receiving the bearing. One or more first integral spring portions extend generally between the inner and outer surfaces and have a first stiffness and one or more second integral spring portions are each spaced circumferentially from the first spring(s). The second spring extends generally between the inner and outer surfaces and has a second, greater stiffness. The body is adjustably angularly positionable about the body axis to adjust a position of the shaft axis with respect to the housing centerline when disposed within the support bore.

28 Claims, 10 Drawing Sheets

FIG. 15

SUPPORT DEVICE FOR BEARING ASSEMBLIES

RELATED APPLICATIONS

This application is a 371 of PCT/US2006/041127, filed on Oct. 20, 2006, which claims the benefit of U.S. Provisional Patent Application 60/728,711, filed on Oct. 20, 2005.

The present invention relates to fluid machinery, and more specifically to bearing assemblies for supporting rotating portions of such fluid machinery.

Support devices for positioning a bearing within a housing are known. Certain previously support devices include integral spring elements that deflect under loading transferred from a shaft to the bearing. Such spring elements are generally identically constructed and spaced circumferentially apart about a center or central axis of the support device. Typically, such support devices are integrally formed with exterior portions of the bearing cage.

SUMMARY OF THE INVENTION

In one aspect, the present invention is a support device for a bearing assembly that includes a housing having a central bore and a centerline extending through the bore and a bearing having a bore for receiving a shaft rotatable about an axis. The support device comprises a generally annular body disposable within the housing bore and having a central axis and inner and outer surfaces extending generally circumferentially about the axis. The body inner surface defines a central bore configured to receive the bearing so as to retain the bearing within the housing bore. The body further has at least one first integral spring portion extending generally between the inner and outer surfaces and having stiffness of a first value and at least one second integral spring portion spaced circumferentially about the axis from the first spring. The second spring extends generally between the inner and outer surfaces and has a stiffness of a second value, the second stiffness value being substantially greater than the first stiffness value. Further, the body is adjustably angularly positionable about the body axis to adjust a position of the shaft axis with respect to the housing centerline when the shaft and bearing are disposed within the support.

In another aspect, the present invention is a support device for a bearing assembly, the bearing assembly including a housing having a central bore and a centerline extending through the bore and a bearing having a bore for receiving a shaft rotatable about an axis, the shaft exerting a load force on the bearing. The support device comprises a generally annular body disposable within the housing bore and having a central axis, inner and outer surfaces extending generally circumferentially about the axis, the inner surface defining a central bore configured to receive the bearing so as to retain the bearing within the housing bore. The support body is at least partially radially deflectable by the shaft load force and adjustably angularly positionable about the body axis when the shaft and bearing are disposed within the support bore so as to position the shaft such that the shaft axis is located generally collinear with the housing centerline.

In a further aspect, the present invention is a bearing assembly for supporting a rotating shaft, the shaft being rotatable about a central axis. The bearing assembly comprises a housing having a central bore and a centerline extending through the bore, a bearing having a bore for receiving a portion of the shaft, and a generally annular support device disposable within the housing bore. The support device has a central axis and inner and outer surfaces extending generally circumfer-entially about the axis, the inner surface defining a central bore configured to receive the bearing so as to retain the bearing within the housing bore. The support device further has at least one first integral spring portion extending generally between the inner and outer surfaces and having stiffness of a first value, and at least one second integral spring portion spaced circumferentially about the axis from the first spring. The second spring extends generally between the inner and outer surfaces and has stiffness of a second value, the second stiffness value being substantially greater than the first stiffness value. Further, the support device is adjustably angularly positionable about the body axis to adjust a position of the shaft axis with respect to the housing centerline when the shaft and bearing are disposed within the support.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. As used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 a support device 10 for a bearing assembly 1, the bearing assembly 1 including a housing 2 and bearing 3. The housing 2 has inner circumferential surface 2a at least partially defining a central bore 4 and a centerline $L_H$ extending through the bore 4, and the bearing 3 has a bore 5 for receiving a shaft S rotatable about an axis $A_S$ and an outer circumferential surface 3a. The support device 10 includes a generally annular body 12 disposable within the housing bore 4 and having a central axis $A_B$, inner and outer circumferential surfaces 14, 16 extending about the axis $A_B$, and opposing radial or "side" surfaces 15A, 15B. The inner circumferential surface 14 defines a central bore 18 configured to receive the bearing 3 such that the support device 10 retains the bearing 3 positioned within the housing bore 4. Further, at least one and preferably a plurality of first integral spring portions 20 each extend generally between the inner and outer surfaces 14, 16 and have stiffness of a first value $K_1$. Additionally, at least one and preferably a plurality of second integral spring portions 22 are spaced circumferentially about the body axis $A_B$ from the one or more first springs 20, each second spring 22 also extending generally between the inner and outer surfaces 14, 16 and have stiffness of a second value $K_2$. The second stiffness value $K_2$ is substantially greater than the first stiffness value $K_1$, such that each first spring 20 has a substantially greater spring constant than each second spring 22.

Figure 3:
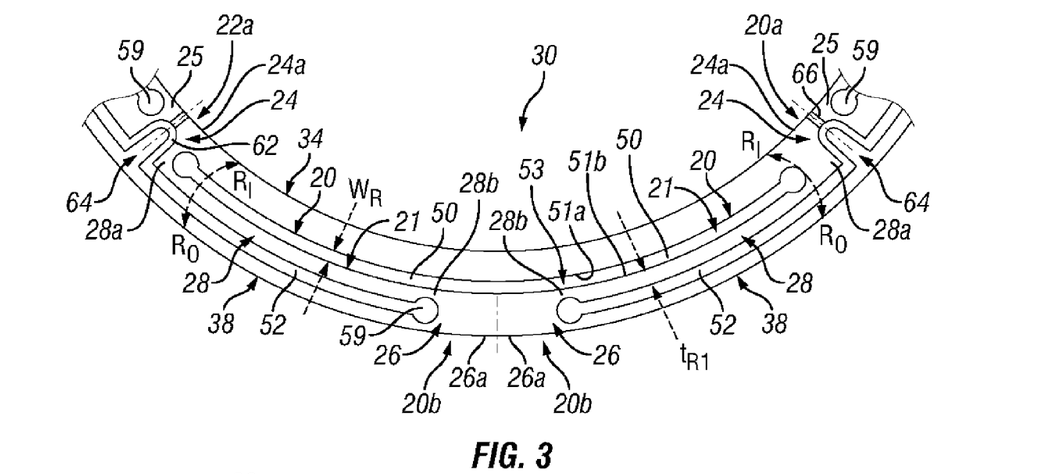
FIG. 3 is a greatly enlarged, broken-away front plan view of the support device, showing a first spring assembly.
Figure 4:
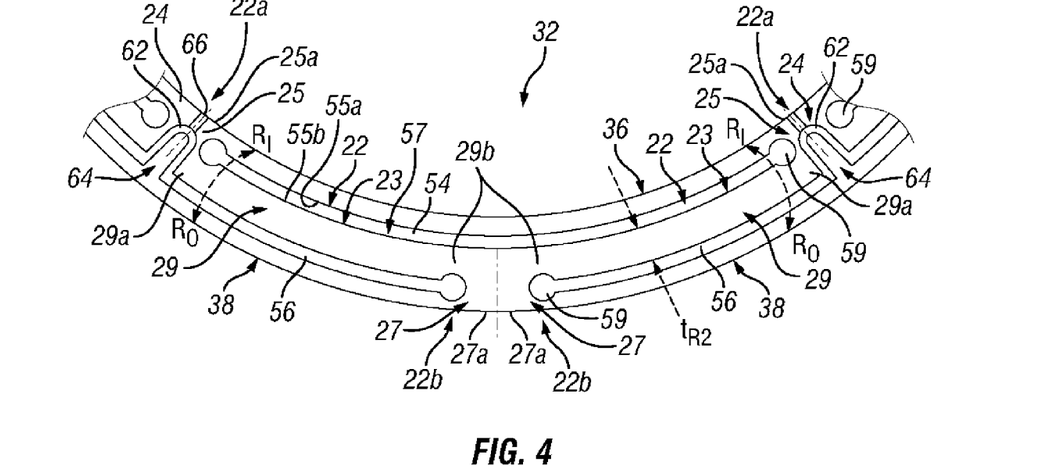
FIG. 4 is a greatly enlarged, broken-away front plan view of the support device, showing a second spring assembly.

Each one of the first and second springs 20, 22 includes a first end 20a, 22a generally contactable with the bearing outer surface 3a and a second end 20b, 22b generally contactable with the housing inner surface 2a. Preferably, each spring 20, 22 is a "cantilever" spring that includes a generally arcuate cantilever portion 21, 23, respectively, extending generally circumferentially with respect to the body axis $A_B$. Each spring cantilever portion 21, 23 is deflectable or bendable with respect to the body axis $A_B$ in generally radial directions $R_I$, $R_O$, as indicated in FIGS. 3 and 4. Further, each cantilever portion 21, 23 has a radial thickness $t_{R1}$, $t_{R2}$, the radial thickness $t_{R2}$ of each second spring cantilever portion 23 being substantially greater than the radial thickness $t_{R1}$ of each first spring cantilever portion 21, thus providing the greater stiffness of the second springs 22.

With the above structure, the body 12 is adjustably angularly positionable about the body axis $A_B$ to adjust a position of the shaft axis $A_S$ with respect to the housing centerline $L_H$ when the shaft S and bearing 3 are disposed within the support device 10, specifically the bore 18. Preferably, the housing inner circumferential surface 2a extends at least partially eccentrically about the housing centerline $L_H$ such that the housing bore 4 is generally eccentric (i.e., about the centerline $L_H$) and the shaft S has a load F that exerts a net force on the bearing 3 generally along a radial line of force or "load line" $L_F$. Such a shaft load F includes the weight of the shaft S and of any components carried thereon (e.g., impellers, a separator, etc.), and may include horizontal or vertically-upward directed loading generated dynamically during turbomachine operation (e.g., exerted by a volute). The support device body 12 is angularly displaceable in opposing directions $C_1$, $C_2$ about the central axis $A_B$ to position the first and second springs 20, 22 with respect to the shaft S such that the load F deflects at least one, and preferably a plurality, of the first and second springs 20, 22 by a radial "deflection" distance $D_n$ in order to position the shaft axis $A_S$ generally collinearly with the housing centerline $L_H$.

In other words, the support body 12 may be angularly adjusted within the housing bore 4 until either the first spring(s) 20 or the second spring(s) 22 carry a greater portion of the load F than the other springs 22, 20, as necessary for the resultant deflection caused by the load F to "center" the shaft S within the housing 2. More specifically, the shaft S displaces a greater distance $d_{Sn}$ with respect to the housing 2 (e.g., downward vertically, laterally sideways, etc.) when the first spring(s) 20 are more proximal than the second spring(s) 22 to the load line $L_F$, as discussed further below. By being adjustable to accommodate different loading conditions, the support device 10 of the present invention provides a "standard design" whereby the single support device 10 may be used in a variety of different applications, products, etc. and is capable of accommodating variations due to manufacturing tolerances, etc. in any particular application (e.g., a specific compressor model).

Having described the basic elements and function above, these and other components of the support device 10 and bearing assembly 1 of the present invention are described in greater detail below.

Figure 2:
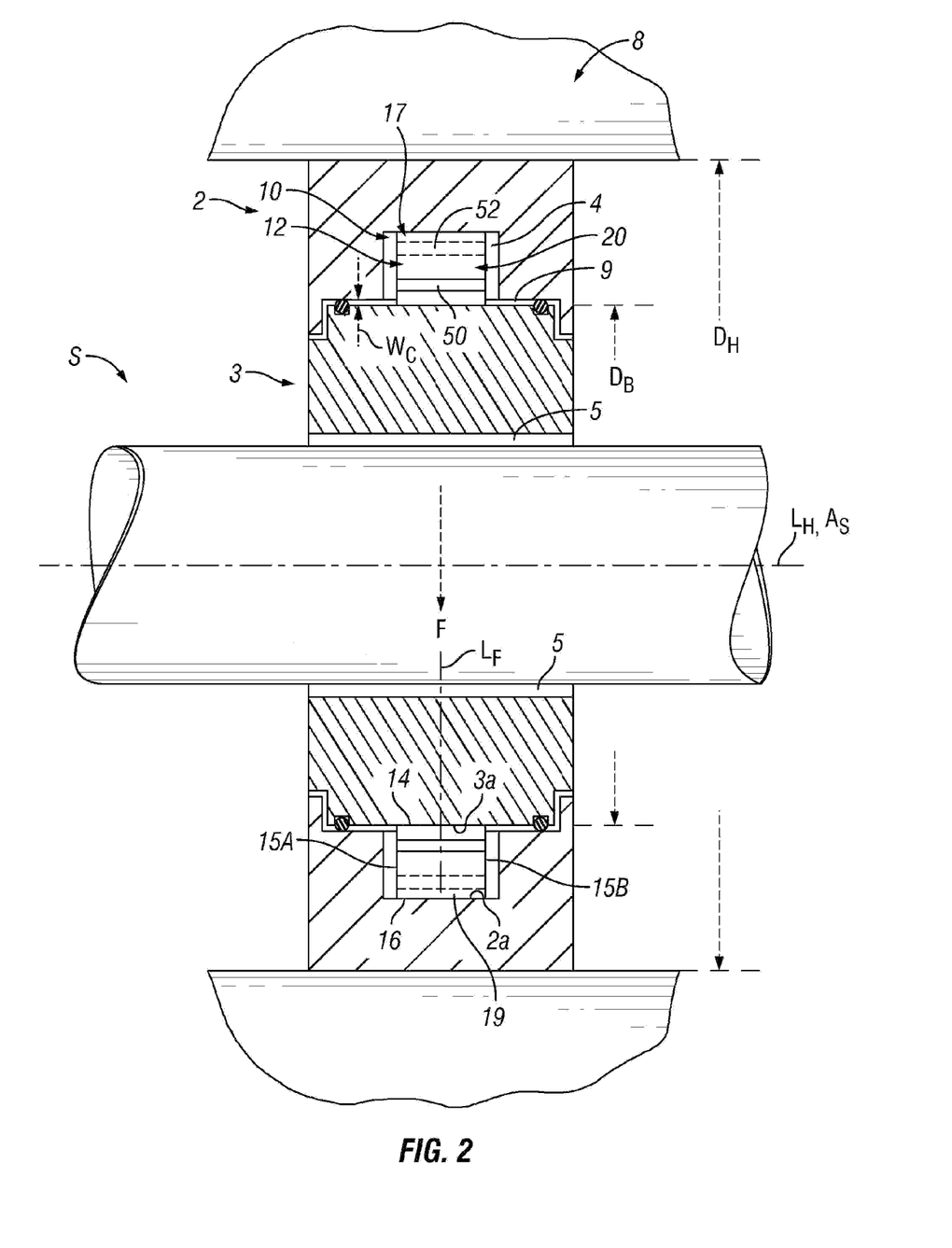
FIG. 2 is a side elevational view in cross-sectional view of the support device, shown disposed within a bearing assembly.

Referring particularly to FIG. 2, the support device 10 is preferably used with a bearing assembly 1 that includes a squeeze film damper bearing 3. As such bearings are known and the specific bearing structure is not the subject of the present invention, the details of the preferred squeeze film bearing 3 are beyond the scope of the present disclosure. However, it must be noted that the support device 10 may be used with any type of bearing, such as for example, journal bearings, ball bearings, needle bearings, roller bearings, etc., of any appropriate size or configuration, as long as the support device 10 is capable of generally functioning as described herein. Further, although the housing 2 is preferably formed with an eccentric bore 4, the housing 2 may have a substantially circular bore, and may be formed in any appropriate manner that is capable of receiving the support device 10 and enabling the support device 10 to function as generally described herein. Additionally, the bearing assembly 1 is preferably formed with a annular clearance space 9 between the bearing outside diameter $D_B$ and the housing inside diameter $D_H$ which is at least partially filled with a damping fluid (e.g., oil), as best shown in FIG. 2. The clearance space 9 has a radial width $w_C$ sized to provide a "squeeze film" damping action between the bearing 3 and the housing 2, which is particularly beneficial as the preferred slotted openings (described below) of the support device 10 are typically too large/wide to generate squeeze film damping, as discussed below.

Figure 5:
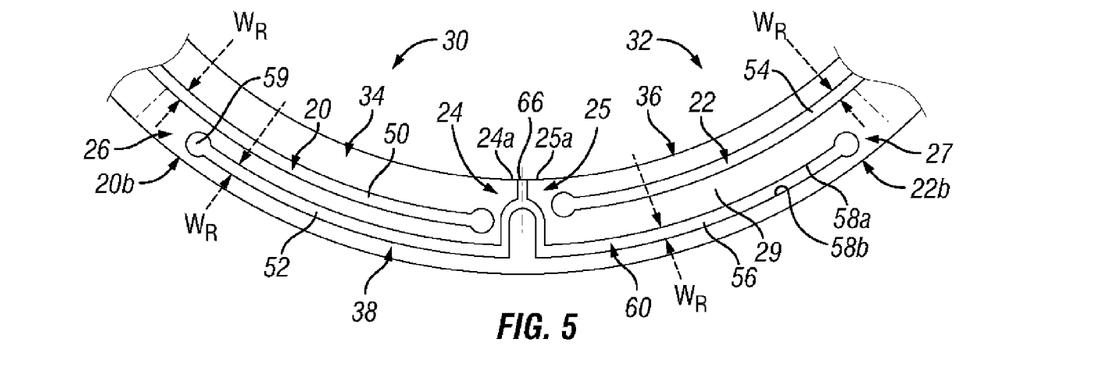
FIG. 5 is a greatly enlarged, broken-away front plan view of the support device, showing an interface section between first spring and second spring assemblies.
Figure 6:
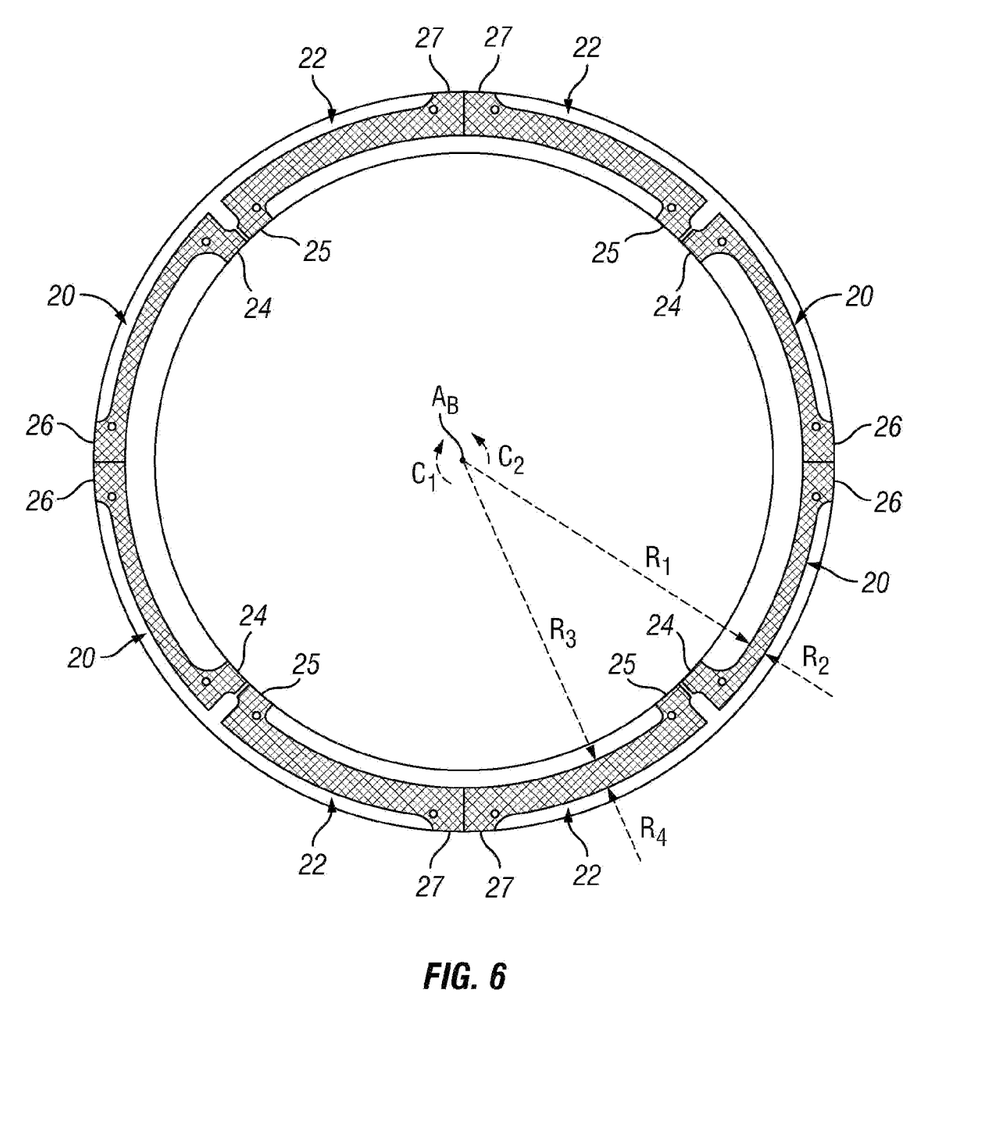
FIG. 6 is another front plan view of the support device, shown with spring portions shaded to indicate potential load paths through the support device body.

Referring now to FIGS. 3-5, each of the first and second springs 20, 22 preferably includes an inner support portion 24, 25, respectively, contactable with the bearing 3 and an outer base portion 26, 27, respectively, contactable with the housing 2. A central, elongated portion 28, 29 extends between each support portion 24, 25 and the associated base portions 26, 27, and provides the spring cantilever portion 21, 23, as discussed above. Each support portion 24, 25 is formed of a generally rectangular, inner section of the body 12 has a surface 24a, 25a contactable with the bearing outer surface 3a. Further, each base portion 26, 27 is formed of a generally rectangular, outer section of the annular body 12 and has a surface 26a, 27a contactable with the housing inner surface 2a. Furthermore, the central or "cantilever" portion 28, 29 of each spring 20, 22 is formed of a generally arcuate, central section of the body 12 that extends generally circumferentially about the body axis $A_B$. Each cantilever portion 28, 29 has a first end 28a, 29a integrally connected or formed with the associated support portion 24, 25 and a second end 28b, 29b integrally connected/formed with the associated base portion 26, 27. As discussed above, the cantilever portions 28, 29 are each deflectable about the connected base portion 26, 27, such that the support portion 24, is generally radially displaceable with respect to the body axis $A_B$ in opposing directions $R_I$, $R_O$. In other words, each cantilever portion 28, 29 is bendable about a stationary base portion 26, 27 to move the cantilever "free" end 28a, 29a in the nature of a cantilever beam, to thereby displace the connected support portion 24, 25, and thus the bearing 3 and shaft S, as indicated in FIGS. 3, 4 and 9-14.

Furthermore, the support body 12 preferably includes at least two first spring portions 20 arranged such that the base portions 26 of the two springs 20 are integrally connected to form a first spring assembly 30. The cantilever portions 28 of the two connected first springs 20 preferably extend from the associated base portion 26 in opposing angular directions about the central axis $A_B$, such that each spring assembly 30 is generally T-shaped. Most preferably, the support device 10 includes two first spring assemblies 30 spaced apart circumferentially about the body axis $A_B$ by about one hundred eighty degrees (180°). Similarly, the support body 12 also preferably includes at least two second springs 22 with integrally connected base portions 27 and cantilever portions 29 extending in opposing angular directions, which form a generally T-shaped second spring assembly 32. As with the first spring assemblies 30, the support device 10 also preferably includes at least two second spring assemblies 32, the two second spring assemblies 32 being spaced apart circumferentially about the body axis $A_B$ by about one hundred eighty degrees (180°), each second spring assembly 32 being generally spaced about ninety degrees apart from each one of the two first spring assemblies 30. Thus, the support device 10 preferably includes two each of the first and second spring assemblies 30, 32 arranged so as to alternate circumferentially about the body axis $A_B$.

Figure 7:
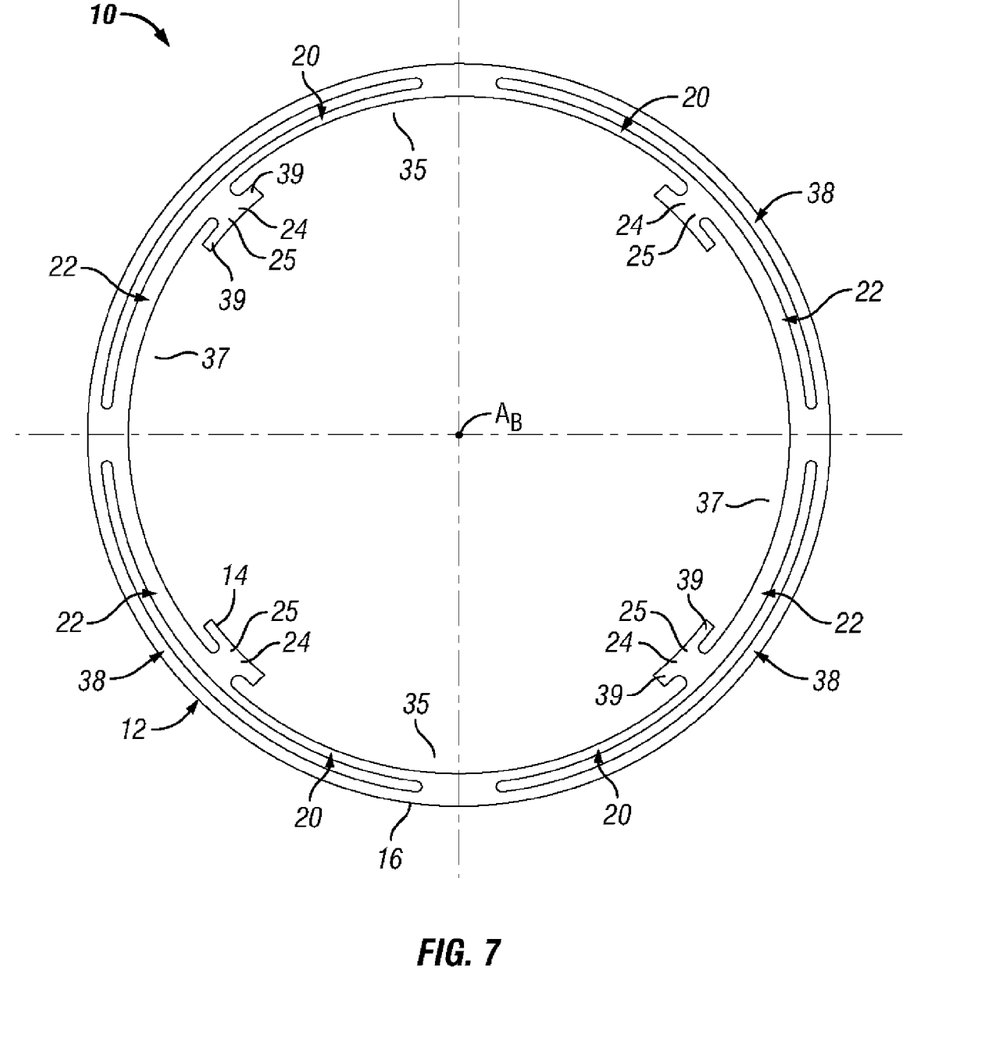
FIG. 7 is an alternative construction of the support device.

Furthermore, the support portion 24 of each first spring 20 is preferably integrally formed with the support portion 25 of an adjacent second spring 22, and vice-versa, although the adjacent support portions 24, 25 may alternatively be separated by providing an appropriate slot or opening therebetween (not shown). Preferably, the support body 12 further has a plurality of generally arcuate, inner connector portions 34 each extending between the two first spring support portions 24 of each first spring assembly 30. Additionally, one or more other arcuate inner connector portions 36 each extend between the two second spring support portions 25 of each second spring assembly 32. As such, with the integrally formed adjacent support portions 24 and 25 and the integral connector portions 34, 36, the body inner surface 14 is substantially continuous about the body axis $A_B$, such that the load F transferred from the bearing 3 to the support device 10 is distributed across a relatively large area, thereby reducing localized stresses. However, as shown in FIG. 7, the support body 12 may be formed such that a generally arcuate recess 35 extends radially outwardly from the body inner surface 14 and between the two support portions 24 of each first spring assembly 30, and another generally arcuate recess 37 extends radially outwardly from the body inner surface 14 and between the two support portions 25 of each second spring assembly 32. In such an alternative design, the overall weight of the support device 10 is reduced, but stresses may be concentrated at the first and second support portions 24, 25, which may be partially alleviated by providing extensions 39 to increase the support portion contact area.

Figure 8:
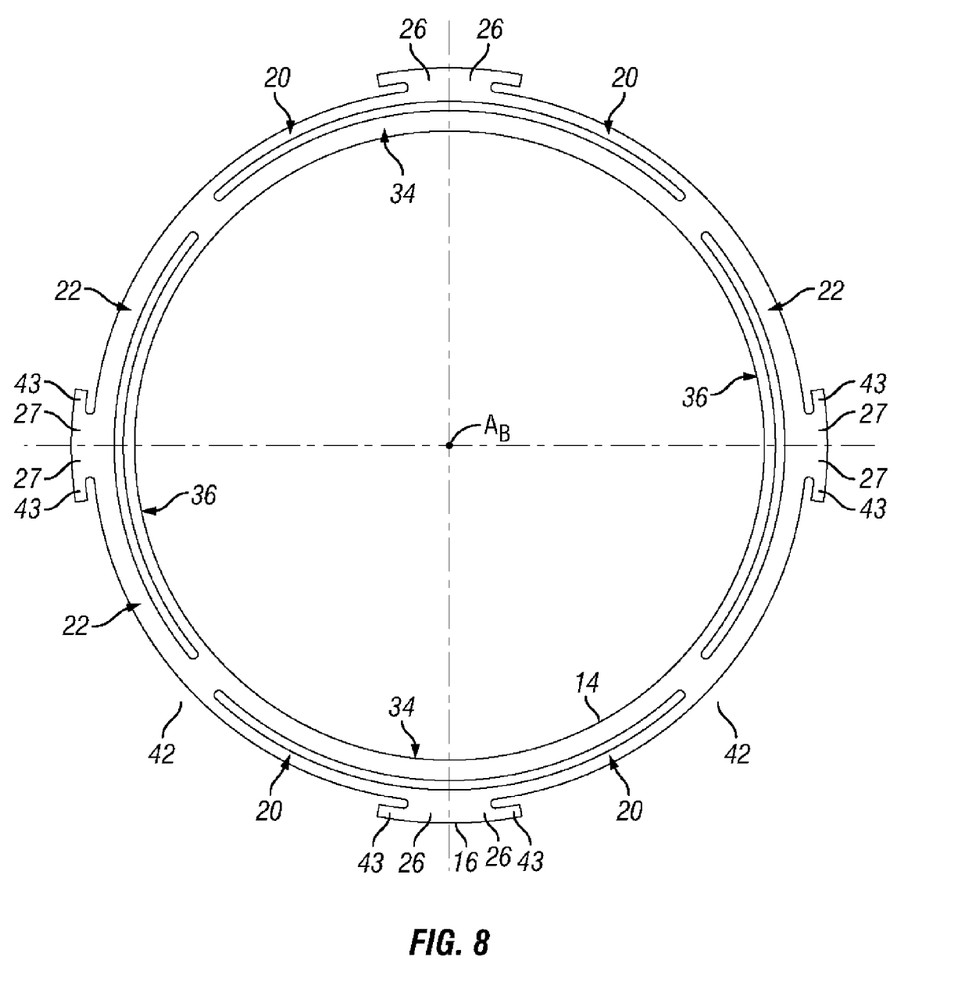
FIG. 8 is another alternative construction of the support device.

Furthermore, the support body 12 preferably further has a plurality of generally arcuate, outer connector portions 38 each extending between one first spring base portion 26 and the base portion 27 of the adjacent second spring 22, and vice versa. Such outer connector portions 38 enable the body outer surface 16 to be substantially continuous and distributes the load F from the support device 10 to the housing 2 across a relatively large contact area, and thus minimizes stress concentration. However, as shown in FIG. 8, the support device 10 may alternatively be formed with a plurality of generally arcuate recesses 42, which each extend radially inwardly from the body outer surface 16 and circumferentially between pairs of adjacent first and second spring base portions 26, 27. As with the inner recesses 35 and 37, the outer recesses 42 reduce weight, but may increase stress concentration, such that the spring base portions 26, 27 may be provided with extensions 43 to increase the base portion contact area. Further, the inner and outer recesses 35, 37 and 42 may be formed by any appropriate method, such as milling or otherwise machining between the integral support portions 24, 25 and/or base portions 26, 27, or by casting or otherwise forming the support body 12 with inwardly-projecting support portions 24, 25 and/or outwardly-projecting base portions 26, 27.

Referring now to FIGS. 1 and 3-5, the integral cantilever springs 20 and 22 are preferably formed by providing a plurality of slotted openings in the support body 12. More specifically, the support body 12 preferably includes at least one and preferably four first arcuate slotted openings 50 and at least one and preferably four second arcuate slotted opening 52. Each of the first and second slotted openings 50, 52 extends axially between the radial surfaces 15A, 15B and has a central radius $R_1$, $R_2$, respectively, about the body axis $A_B$. Further, the second opening radius $R_2$ is greater than the first opening radius $R_1$ and each second opening 52 is spaced radially outwardly from one of the first openings 50, such that the cantilever portion 28 of one first spring 20 is at least partially defined between each proximal pair of first and second openings 50, 52. Most preferably, the four first slotted openings 50 are arranged in two pairs, with each pair of openings 50 being defined by two facing circumferential surfaces 51a, 51b that form a single, relatively long continuous slot 53, but may alternatively be provided by two separate openings 50 (not shown).

Furthermore, the body 12 also preferably includes at least one and preferably four third arcuate slotted openings 54 and at least one and preferably four fourth arcuate slotted openings 56. Each slotted opening 54, 56 extends axially between the body radial surfaces 15A, 15B, and has a central radius $R_3$, $R_4$ about the body axis $A_B$. The fourth opening radius $R_4$ is greater than the third opening radius $R_3$, and the fourth opening 56 is spaced radially outwardly from the third opening 54 such that the cantilever portion 29 of one second spring 22 is at least partially defined between the third and fourth openings 54, 56. Most preferably, the four third slotted openings 54 are arranged in two pairs, with each pair of openings 54 being defined by two facing circumferential surfaces 55a, 55b that form a single, relatively long continuous slot 57, but may alternatively be provided as completely separate openings 54, 56 (not shown).

Further, each pair of third and fourth openings 54, 56 is spaced circumferentially from each pair of first and second openings 50, 52, such that the four pairs of openings 50/52 and 54/56 alternate circumferentially about the body axis $A_B$. Furthermore, each first radius 50 is preferably greater than each third radius 54, or alternatively each fourth radius 56 is greater than each second radius 52, such that the second spring cantilever portion 29 has a radial thickness $t_{R2}$ that is substantially greater than a radial thickness $t_{R1}$ of the first spring cantilever portion 28, as discussed above. As such, each second spring 22 has greater stiffness, and thus deflects a lesser distance for a given load F, as compared with each first spring 20, as described above and in further detail below.

Additionally, each fourth opening radius $R_4$ is generally equal to each second opening radius $R_2$ and the second and fourth openings 52, 56 are preferably both generally defined by a single pair of facing circumferential surfaces 58a, 58b. In other words, each second and fourth openings 52, 56 are provided by a single, relatively long slot 60, although the two openings 52, 56 may be formed as separate openings (not shown). Preferably, each slot 60 (and thus the surfaces 58a, 58b defining the slot 60) has a central, radially inwardly off-set section 62 connecting the associated second and fourth openings 52, 56 and forming a generally "U-shaped" hinge 64 between adjacent first and second springs 20, 22. Each hinge 62 is configured to enable relative circumferential movement of the adjacent pairs of springs 20, 22, thereby facilitating generally radial movement of each spring cantilever portion 21 or 23. Furthermore, the body 12 may also include a generally radial slotted opening 66 extending from the body inner surface 14 to each slot offset section 62, such that each adjacent pair of springs 20, 22 is unconnected, as shown in FIGS. 3-5. As such, the radial slots 66 each further increase the capability of relative movement between adjacent springs 20, 22. However, the body 12 may alternatively be provided with semi-circular openings or "scallops" each disposed generally centrally in a separate one of the preferred outer slots 60, to function essentially as a hinge, or the slots 60 may be formed without any hinge or scallops (neither shown).

Referring particularly to FIG. 5, each one of the first, second, third and fourth slotted openings 50, 52, 54 and 56 is preferably formed with a radial width $w_R$ of at least five thousands of an inch (0.005") and most preferably of at least five thousands of an inch (0.0010") to provide sufficient clearance for the springs 20, 22 to deflect without "bottoming out". However, with slot radial widths $w_R$ of such magnitude, the ability of the support device 10 to provide damping is negligible, particularly in comparison to the damping action provided in the annular clearance space 9 between the bearing 3 and housing 2, as discussed above. As such, each slotted opening 50, 52, 54 and 56 may be formed with a radial width of at least twenty $w_R$ of at least twenty thousands of an inch (0.020") and even thirty thousands of an inch (0.030") or greater. With smaller size bearings 3, the support device 10 may have slotted openings 50, 52, 54 and 56 formed by a wire EDM process, or any other precision cutting process, and when used with larger diameter bearings 3, the openings 50, 52, 54, 56 may be formed by another process, such as milling. Further, the slotted openings 50, 52, 54 and 56 may be formed so as to include enlarged end portions 59, as shown in FIGS. 3-5, which both serve to provide a opening for feeding EDM wire during fabrication and to reduce stress concentration. Additionally, the support device 10 may further comprise a polymeric or rubber material (not depicted) disposed within at least one of the slotted openings 50, 52, 54 or 56 so as to provide damping of the device 10.

Figure 1:
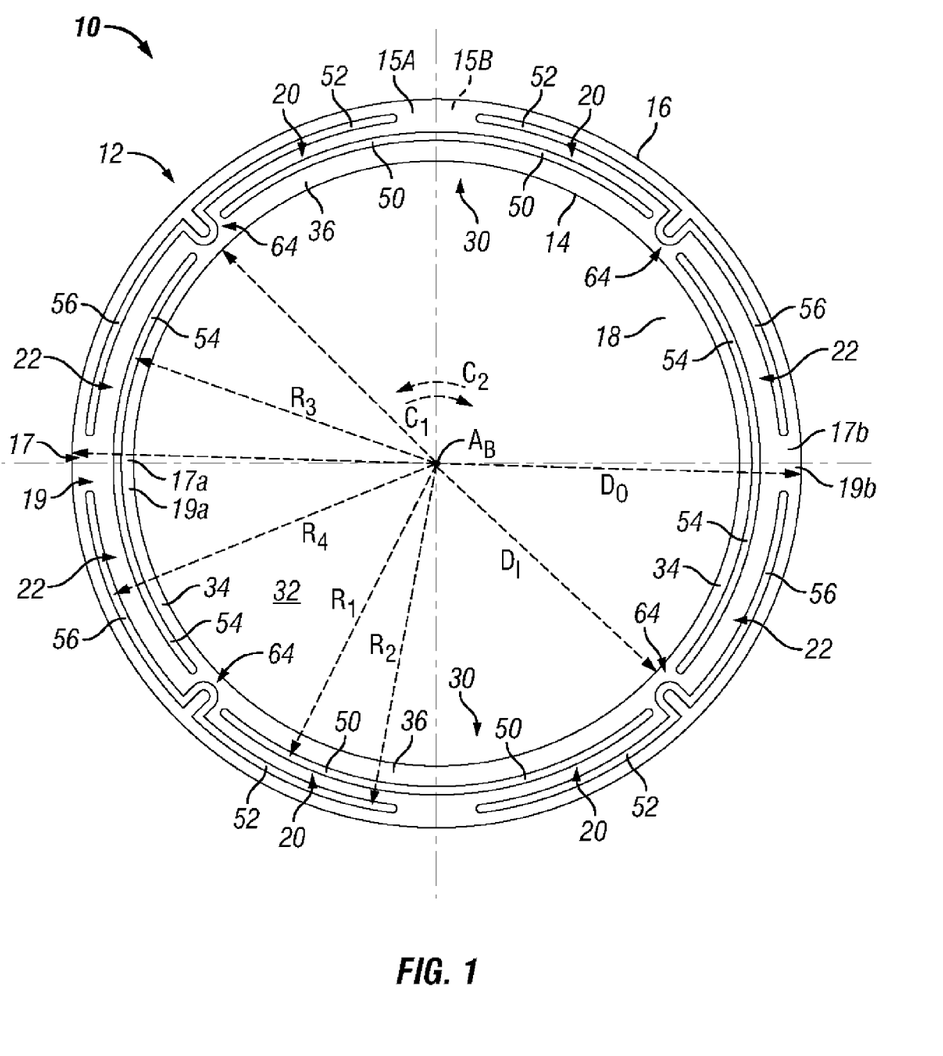
FIG. 1 is a front plan view of a presently preferred embodiment of a support device in accordance with the present invention.
Figure 15:
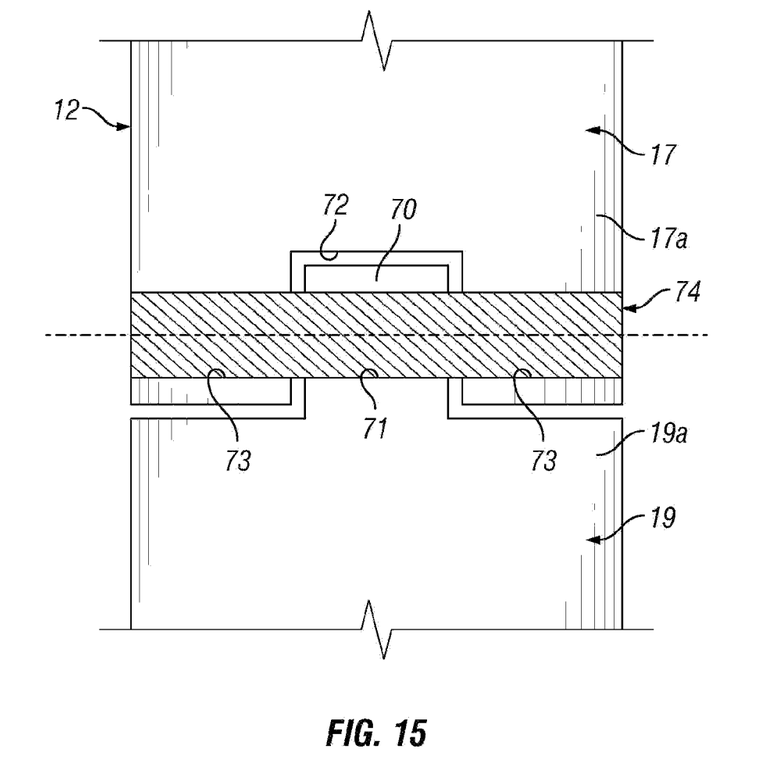
FIG. 15 is a greatly enlarged, broken away side view of an annular body of the support device, showing a preferred connection of two body halves.

Referring to FIGS. 1, 2 and 15, the annular body 12 is preferably "horizontally split" or formed of upper and lower semi-circular ring halves 17, 19 assembled together to form the overall body 12, as indicated in FIG. 1, so as to facilitate installment of the support device 10 within the bearing assembly 1. As best shown in FIG. 15, each ring half 17, 19 has two opposing ends 17a, 17b and 19a, 19b, respectively, disposable against a corresponding end of other ring half 19, 17 to form abutting ring end pairs 17a/19a and 17b/19b. Most preferably, one end of each pair 17a/19a and 17b/19b has a lug 70 with a through hole 71 and the other end of each pair 17a/19a and 17b/19b has a pocket 72 configured to receive the lug 70 and having aligned holes 73. The support device 10 further has two pins 74 each disposable within one of the sets of aligned holes 71 and 73 so as to retain each lug 70 within each pocket 72, thereby releasably connecting the two ring halves 17, 19. However, the support body 12 may alternatively be formed as a single, integral circular ring, two "vertically split" semi-circular ring halves, three of more separate arcuate segments assembled together to form the body 12, etc. (none shown).

Preferably, the support body 12 has an inside diameter $D_I$ sized lesser than the bearing outside diameter $D_B$ and an outside diameter $D_O$ sized greater than the housing bore inside diameter $D_H$, as indicated in FIG. 2. As such, the support inner surface 14 and bearing outer surface 3a engage with a friction fit, and the support outer surface 16 and housing inner surface 2a engage also with a friction fit. With such engagement of support device surfaces 14, 16 and bearing and housing surfaces 3a, 2a, fretting of the support device 10 is minimized, and preferably substantially eliminated. However, the support device 10 may be engaged with the bearing 3 and/or housing 2 by any appropriate means, such a threaded fasteners, keys, etc. Additionally, the support device body 12 is preferably fixable within the housing 2 by appropriate means, preferably by doweling, so as to retain the angular position of the support device 10 about the housing centerline $C_H$.

Referring to FIG. 2, prior to use, the bearing assembly 1 with the support device 10 of the present invention is assembled generally in the following manner. The bearing 3 is mounted within the central bore 18 of the support device 10, and the support device 10 is mounted within the housing bore 4. Initially, the support body 12 is not fixed within the housing 2, so as to enable angular adjustment thereof, as discussed below. Further, the bearing assembly 1 is then mounted about the shaft S such that the shaft S extends through the bearing bore 5, either by directly assembling the bearing assembly 1 upon the shaft S or by mounting the bearing assembly 1 within a turbomachine casing 8 (FIG. 2) and then inserting the shaft S through the bearing bore 5.

Figure 9:
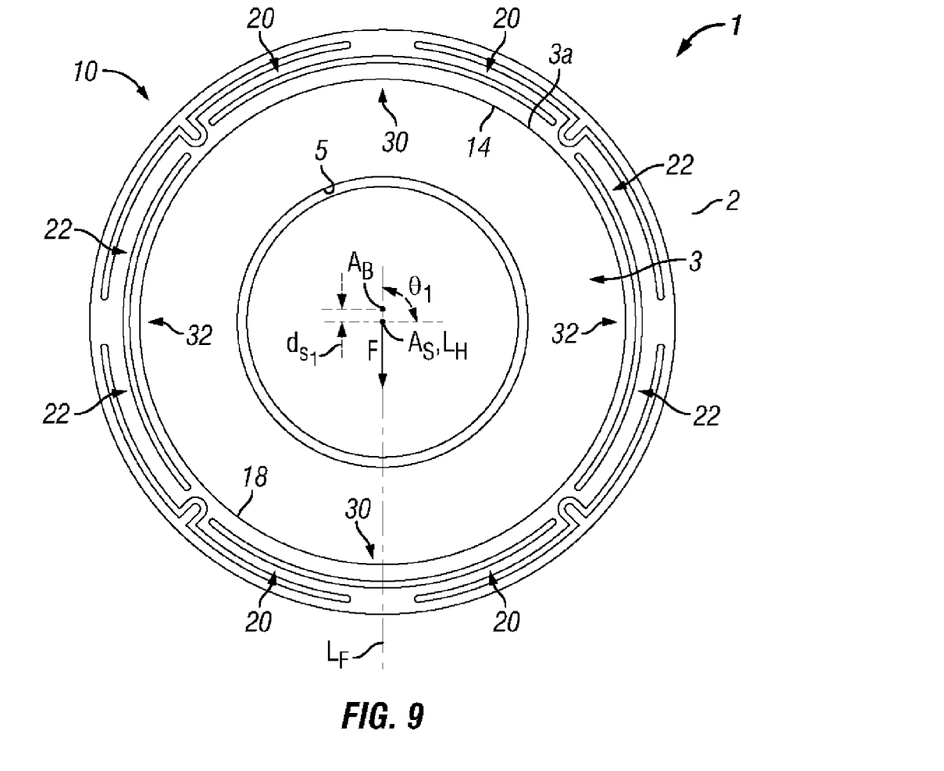
FIG. 9 is an elevational view of the support device in a bearing assembly, shown in a first position about a body axis.
Figure 10:
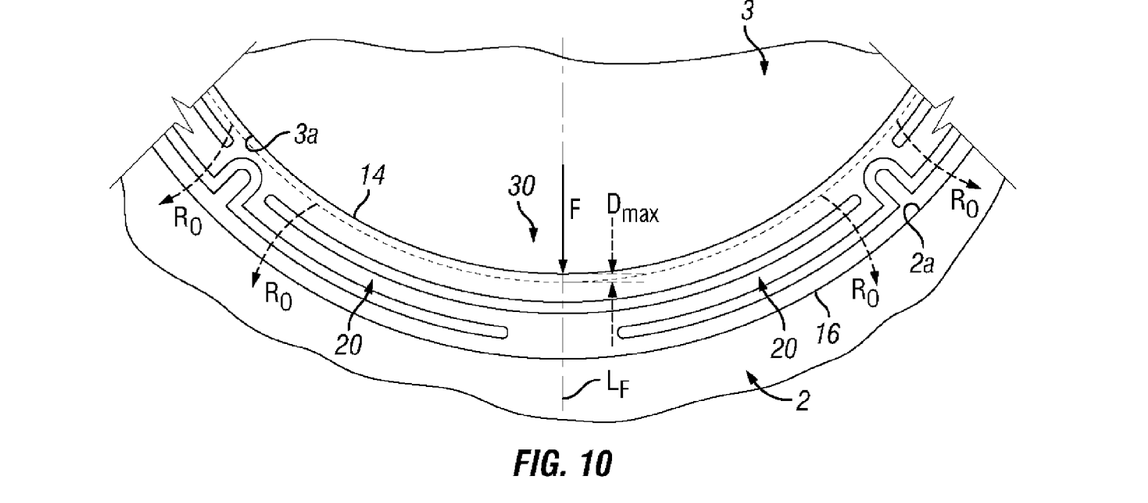
FIG. 10 is a greatly enlarged, broken-away view of a bottom portion of FIG. 9.
Figure 11:
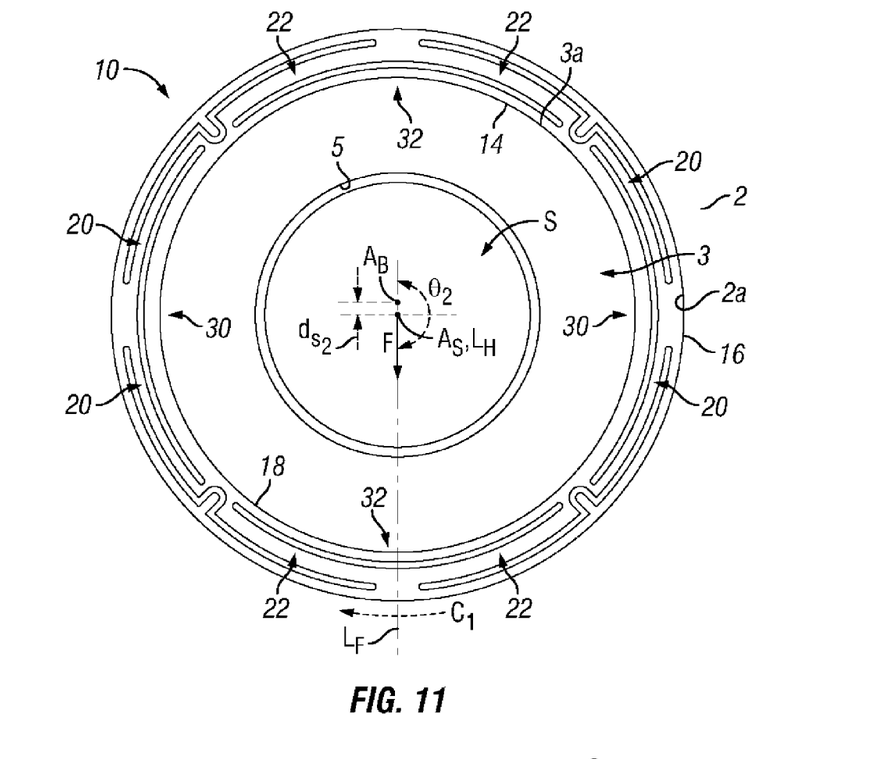
FIG. 11 is an elevational view of the support device in a bearing assembly, shown in a second position about the body axis.
Figure 12:
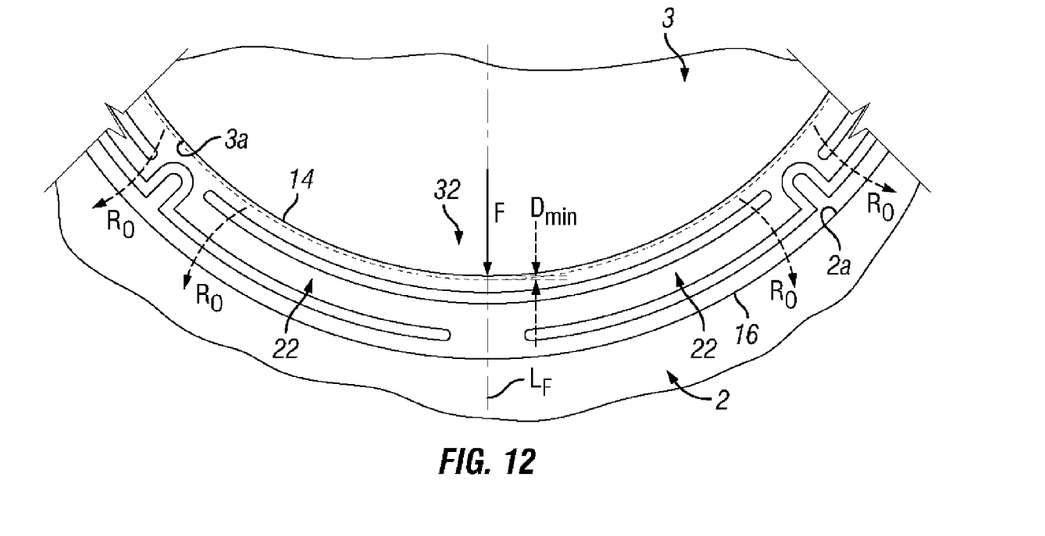
FIG. 12 is a greatly enlarged, broken-away view of a bottom portion of FIG. 11.

In either case, the support device 10 may be adjusted to accommodate the specific shaft loading conditions, as follows. When the magnitude of the load force F is relatively lesser and/or the eccentricity of the housing bore 4 is relatively greater, the support body 12 may be positioned about the housing centerline $L_H$ or shaft axis $A_S$, for example at a "first" angular position $\theta_1$, such that one of the two first spring assemblies 30 is generally centered upon the load line $L_F$, as shown in FIGS. 9 and 10. It must be noted that, as discussed herein, the designation of any particular angular position $\theta_n$ as "first", "second", etc. is solely for convenience of discussion only, and the support device 10 may be assembled in the bearing assembly 1 at any particular first or initial position, and may be displaced or rotated therefrom as necessary to "center" the shaft S. In the first position described above and shown in FIGS. 9 and 10, a given load F will cause the greatest amount of deflection $D_{MAX}$ of the support device 10, which preferably permits the shaft S to displace by a distance $d_{S1}$ sufficient to position the shaft axis $A_S$ generally collinear with the housing centerline $L_H$. When the load force magnitude is relatively greater and/or the eccentricity of the housing bore 4 is relatively lesser, the support body 12 may be adjusted about the housing centerline $L_H$ or shaft axis $A_S$, for example rotated in a direction $C_1$ to a second angular position $\theta_2$, such that one of the two second spring assemblies 32 is generally centered upon the load line $L_F$, as shown in FIGS. 11 and 12. In this arrangement, a particular load F will cause the least amount of deflection $D_{MIN}$ of the support device 10, but preferably still enables the shaft S to displace a sufficient distance $d_{S2}$ to position the shaft axis $A_S$ generally collinearly with the housing centerline $L_H$.

Figure 13:
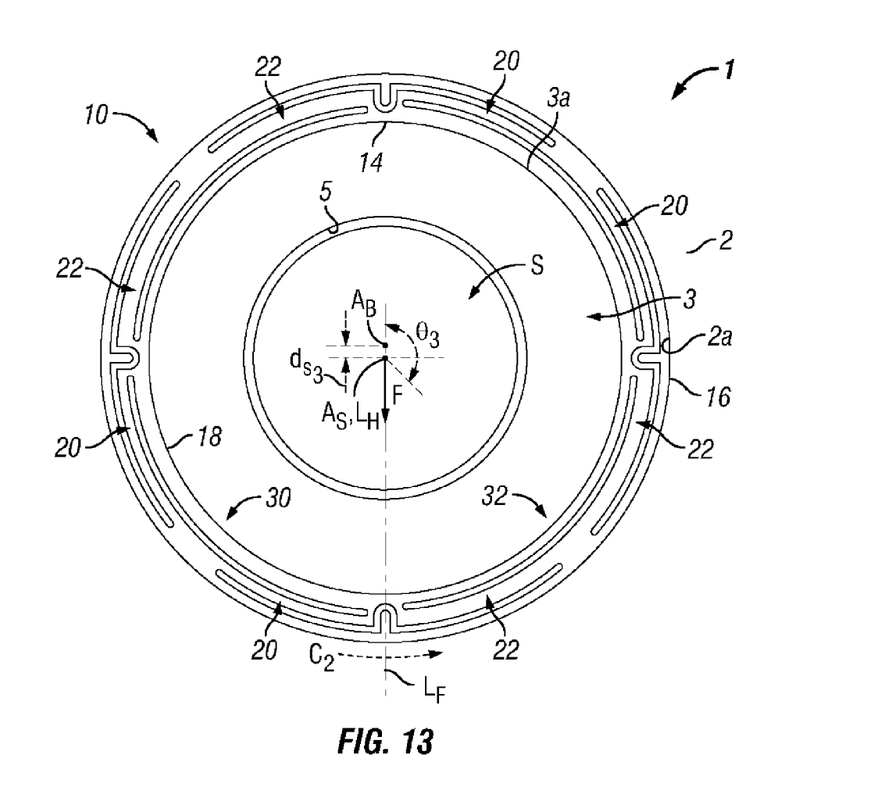
FIG. 13 is an elevational view of the support device in a bearing assembly, shown in a third, intermediate position about the body axis.
Figure 14:
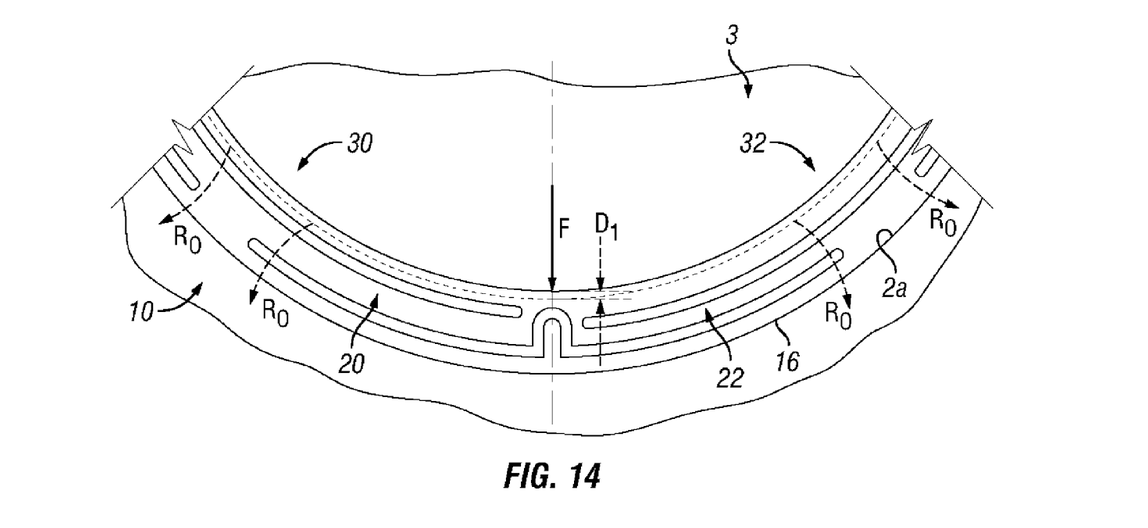
FIG. 14 is a greatly enlarged, broken-away view of a bottom portion of FIG. 13.

Furthermore, the support body 12 may be positioned at any other angular location about the housing centerline $L_H$ or shaft axis $A_S$, for example rotated in an opposing direction $C_2$ to an angular position $\theta_3$, to provide a support device deflection $D_1$ between the limits $D_{MIN}$ and $D_{MAX}$, which preferably permits the shaft S to displace by a distance $d_{S3}$ sufficient to position the shaft axis $A_S$ generally collinear with the housing centerline $L_H$, the support device deflection $D_1$ and shaft displacement $d_{S3}$ depending on the magnitude of the load F, the specific orientation of the load line $L_F$, and/or the housing eccentricity. For example, the support device 10 may be positioned such that the load line $L_F$ extends generally equidistant between one first spring assembly 30 and an adjacent second spring assembly 32, as depicted in FIGS. 13 and 14, such that the load F is generally shared by at least part of the two spring assemblies 30, 32. In any case, the amount of support member deflection $D_n$ (illustrated in the Figures as $D_1$, $D_{MIN}$, and $D_{MAX}$), and thus shaft displacement $d_n$ (illustrated in the Figures as $d_{S1}$, $d_{S2}$, and $d_{S3}$), is relatively greater when one or more first springs 20 support a greater portion of the load F and relatively lesser when one or more second springs 22 support a greater portion of the load F. Further, although the load F is depicted in FIGS. 9-14 as acting along a generally vertical line $L_F$, the actual net load F on the shaft 2 may act along a line $L_F$ that is substantially horizontal, vertically-upward, or at any angle between horizontal and vertical (none depicted). In any case, once the support device 10 has been adjusted to a desired angular position $\theta_n$, the support body 12 is preferably retained at a fixed position within the bearing housing 2, preferably by means of one or more dowels.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention generally as defined in the appended claims.

I claim:

1. A support device for a bearing assembly, the bearing assembly including a housing, the housing having a central bore and a centerline extending through the bore, and a bearing having a bore for receiving a shaft rotatable about an axis, the support device comprising:
    a generally annular body disposable within the housing bore and having a central axis, inner and outer surfaces extending generally circumferentially about the axis, the inner surface defining a central bore configured to receive the bearing so as to retain the bearing within the housing bore, at least one first integral spring portion extending generally between the inner and outer surfaces and having stiffness of a first value wherein the at least one first integral spring portion includes a first generally arcuate cantilever portion, and at least one second integral spring portion spaced circumferentially about the axis from the first spring, the second spring extending generally between the inner and outer surfaces and having stiffness of a second value, the second stiffness value being substantially greater than the first stiffness value wherein the at least one second integral spring portion includes a second generally arcuate cantilever portion, wherein each of the first and second generally arcuate cantilever portions extend generally circumferentially with respect to the body axis and are displaceable with respect to the body axis in generally radial directions, each cantilever portion having a radial thickness, the radial thickness of each second spring cantilever portion being substantially greater than the radial thickness of each first spring cantilever portion, the body being adjustably angularly positionable about the body axis to adjust a position of the shaft axis with respect to the housing centerline when the shaft and bearing are disposed within the support bore.

2. The support device as recited in claim 1 wherein:
    the housing has an inner circumferential surface extending at least partially eccentrically about the housing centerline such that the housing bore is generally eccentric;
    the shaft exerts a load force on the bearing generally along a radial line; and
    the support device body is angularly displaceable about the body central axis to position the first and second springs with respect to the shaft so that the load force deflects at least one of the first and second springs in a generally radial direction to position the shaft such that the shaft axis is generally collinear with the housing centerline.

3. The support device as recited in claim 2 wherein the shaft displaces a greater distance with respect to the housing when the load force line is located generally more proximal to the first spring than to the second spring.

4. The support device as recited in claim 2 wherein each of the first and second springs has a support portion contactable with the bearing and angular displacement of the body about the housing centerline adjusts the position of each spring support portion with respect to the load force line.

5. The support device as recited in claim 1 wherein the support body includes:
    at least two first springs each having a base portion and an elongated central portion extending from the base portion, the two first spring base portions being integrally connected to form a first spring assembly, the two elongated portions extending in opposing angular directions about the central axis; and
    at least two second springs each having a base portion and an elongated central portion extending from the base portion, the two second spring base portions being integrally connected to form a second spring assembly, the two elongated portions extending in opposing angular directions about the central axis.

6. The support device as recited in claim 1 wherein the support body includes:
    at least two first spring assemblies, the two first spring assemblies being spaced apart circumferentially about the body centerline by about one hundred eighty degrees; and
    at least two second spring assemblies, the two second spring assemblies being spaced apart circumferentially about the body axis by about one hundred eighty degrees, each second spring assembly being generally spaced about ninety degrees apart from each one of the two first spring assemblies.

7. The support device as recited in claim 1 wherein each of the first and second springs includes:
    an inner support portion contactable with the bearing; and an outer base portion contactable with the housing,
wherein each of the first and second generally arcuate cantilever portions have ends connected with the support portion and are connected with the base portion, the first and second generally arcuate cantilever portions being deflectable about the base portion such that the support portion is generally radially displaceable with respect to the body axis.

8. The support device as recited in claim 7 wherein:
each spring support portion includes generally rectangular section of the annular body and has a surface contactable with the bearing outer surface; and
each base portion includes generally rectangular section of the annular body and has a surface contactable with the housing inner surface.

9. The support device as recited in claim 7 wherein the support portions of the first and second springs are spaced circumferentially about the body axis and are configured to position a bearing disposed within the support device with respect to the housing bore.

10. The support device as recited in claim 7 wherein:
the inner support portion of each first spring is integrally formed with the inner support portion of an adjacent second spring; and
the outer base portion of each first spring is integrally formed with the outer base portion of an adjacent first spring.

11. The support device as recited in claim 10 wherein one of:
a generally arcuate, inner connector portion extends between each first spring support portion and the support portion of an adjacent first spring and another generally arcuate, inner connector portion extends between each second spring support portion and the support portion of an adjacent second spring; and
a generally arcuate recess extends radially outwardly from the body inner surface and between each first spring support portion and the support portion of an adjacent first spring and
another generally arcuate recess extends radially outwardly from the body inner surface and between each second spring support portion and the support portion of an adjacent second spring.

12. The support device as recited in claim 7 wherein one of:
a generally arcuate, outer connector portion extends between each first spring base portion and the base portion of an adjacent second spring; and
a generally arcuate recess extends radially inwardly from the body outer surface and circumferentially between each first spring base portion and the base portion of an adjacent second spring.

13. The support device as recited in claim 1 wherein:
the bearing has an outer circumferential surface;
the housing has an inner circumferential surface defining the housing bore; and
each one of the first and second springs includes a first end generally contactable with the bearing outer surface and a second end generally contactable with the housing inner surface.

14. The support device as recited in claim 1 wherein the support body includes:
two opposing radial surfaces;
at least one first arcuate slotted opening and at least one second arcuate slotted opening each extending axially between the radial surfaces and having a central radius about the body axis, the second opening radius being greater than the first opening radius and the second opening being spaced radially outwardly from the first opening such that the arcuate cantilever portion of the at least one first spring is at least partially defined between the first and second openings; and
at least one third arcuate slotted opening and at least one fourth arcuate slotted opening each extending axially between the two radial surfaces and having a central radius about the body axis, the fourth opening radius being greater than the third opening radius and the fourth opening being spaced radially outwardly from the third opening such that the arcuate cantilever portion of the at least one second spring is at least partially defined between the third and fourth openings, the third and fourth openings being spaced circumferentially from the first and second openings, at least one of the first radius being greater than the third radius and the fourth radius being greater than the second radius.

15. The support device as recited in claim 14 wherein each pair of adjacent second and fourth arcuate openings are connected by a generally U-shaped slotted opening configured to provide a hinge between the first and second springs partially defined by the second and fourth openings, the hinge being configured to enable relative circumferential movement between the adjacent first and second springs.

16. The support device as recited in claim 15 wherein the support body include at least one generally radial slotted opening extending between each U-shaped slotted opening and the body inner surface, the radially-extending opening being configured to permit relative movement between each adjacent pair of first and second springs.

17. The support device as recited in claim 14 wherein the fourth opening radius is generally equal to the second opening radius and the second and fourth openings are both generally defined by a single pair of facing circumferential surfaces.

18. The support device as recited in claim 17 wherein each of the facing circumferential surfaces has a central, radially-inwardly offset section connecting the associated second and fourth openings.

19. The support device as recited in claim 14 further comprising one of a polymeric material and a rubber material disposed within at least one of the slotted openings.

20. The support device as recited in claim 14 wherein each one of the first, second, third and fourth slotted openings has a radial width of between about 0.005 inches and about 0.0030 inches.

21. The support device as recited in claim 1 wherein the annular body includes at least two separate body sections connected together to form a generally circular ring.

22. The support device as recited in claim 1 wherein the bearing has an outer circumferential surface and an outside diameter, the housing has an inner circumferential surface and an inside diameter, the support device has inner and outer circumferential surfaces and inside and outside diameters, the support inside diameter being lesser than the bearing outside diameter such that the support inner surface and bearing outer surface engage with a friction fit, and the support outside diameter being greater than housing inside diameter such that the support outer surface and bearing inner surface engage with a friction fit.

23. The support device as recited in claim 1 wherein the body is fixable within the housing bore so as to retain the angular position of the support device about the housing centerline.

24. A bearing assembly for supporting a rotating shaft, the shaft being rotatable about a central axis, the bearing assembly comprising:

a housing having a central bore and a centerline extending through the bore;

a bearing having a bore for receiving a portion of the shaft; and a generally annular body disposable within the housing bore and having a central axis, inner and outer surfaces extending generally circumferentially about the axis, the inner surface defining a central bore configured to receive the bearing so as to retain the bearing within the housing bore, at least one first integral spring portion extending generally between the inner and outer surfaces and having stiffness of a first value wherein the at least one first integral spring portion includes a first generally arcuate cantilever portion, and at least one second integral spring portion spaced circumferentially about the axis from the first spring, the second spring extending generally between the inner and outer surfaces and having stiffness of a second value, the second stiffness value being substantially greater than the first stiffness value wherein the at least one second integral spring portion includes a second generally arcuate cantilever portion, wherein each of the first and second generally arcuate cantilever portions extend generally circumferentially with respect to the body axis and are displaceable with respect to the body axis in generally radial directions, each cantilever portion having a radial thickness, the radial thickness of each second spring cantilever portion being substantially greater than the radial thickness of each first spring cantilever portion, the body being adjustably angularly positionable about the body axis to adjust a position of the shaft axis with respect to the housing centerline when the shaft and bearing are disposed within the support.

25. The support device as recited in claim 24 wherein the bearing is a squeeze film damper bearing.

26. A support device for a bearing assembly, the bearing assembly including a housing having a central bore; a centerline extending through the central bore; and an inner circumferential surface extending at least partially eccentrically about the housing centerline such that the housing bore is generally eccentric, and a bearing having a bore for receiving a shaft rotatable about an axis wherein the shaft exerts a load force on the bearing generally along a radial line, the support device comprising:

a generally annular body disposable within the housing bore and having a central axis, inner and outer surfaces extending generally circumferentially about the axis, the inner surface defining a central bore configured to receive the bearing so as to retain the bearing within the housing bore, at least one first integral spring portion extending generally between the inner and outer surfaces and having stiffness of a first value, and at least one second integral spring portion spaced circumferentially about the axis from the first spring, the second spring extending generally between the inner and outer surfaces and having stiffness of a second value, the second stiffness value being substantially greater than the first stiffness value, the body being angularly displaceable about the body central axis to position the first and second springs with respect to the shaft so that the load force deflects at least one of the first and second springs in a generally radial direction to position the shaft such that the shaft axis is generally collinear with the housing centerline.

27. The support device as recited in claim 26 wherein the shaft displaces a greater distance with respect to the housing when the load force line is located generally more proximal to the first spring than to the second spring.

28. The support device as recited in claim 26 wherein each of the first and second springs has a support portion contactable with the bearing and angular displacement of the body about the housing centerline adjusts the position of each spring support portion with respect to the load force line.

* * * * *